July 19, 1960   J. S. KAMBORIAN ET AL   2,945,247
LASTING MACHINE

Filed Aug. 18, 1955   5 Sheets-Sheet 1

Inventors
Jacob S. Kamborian
Thomas A Weisz
by Roberts Cushman & Brown
att'ys

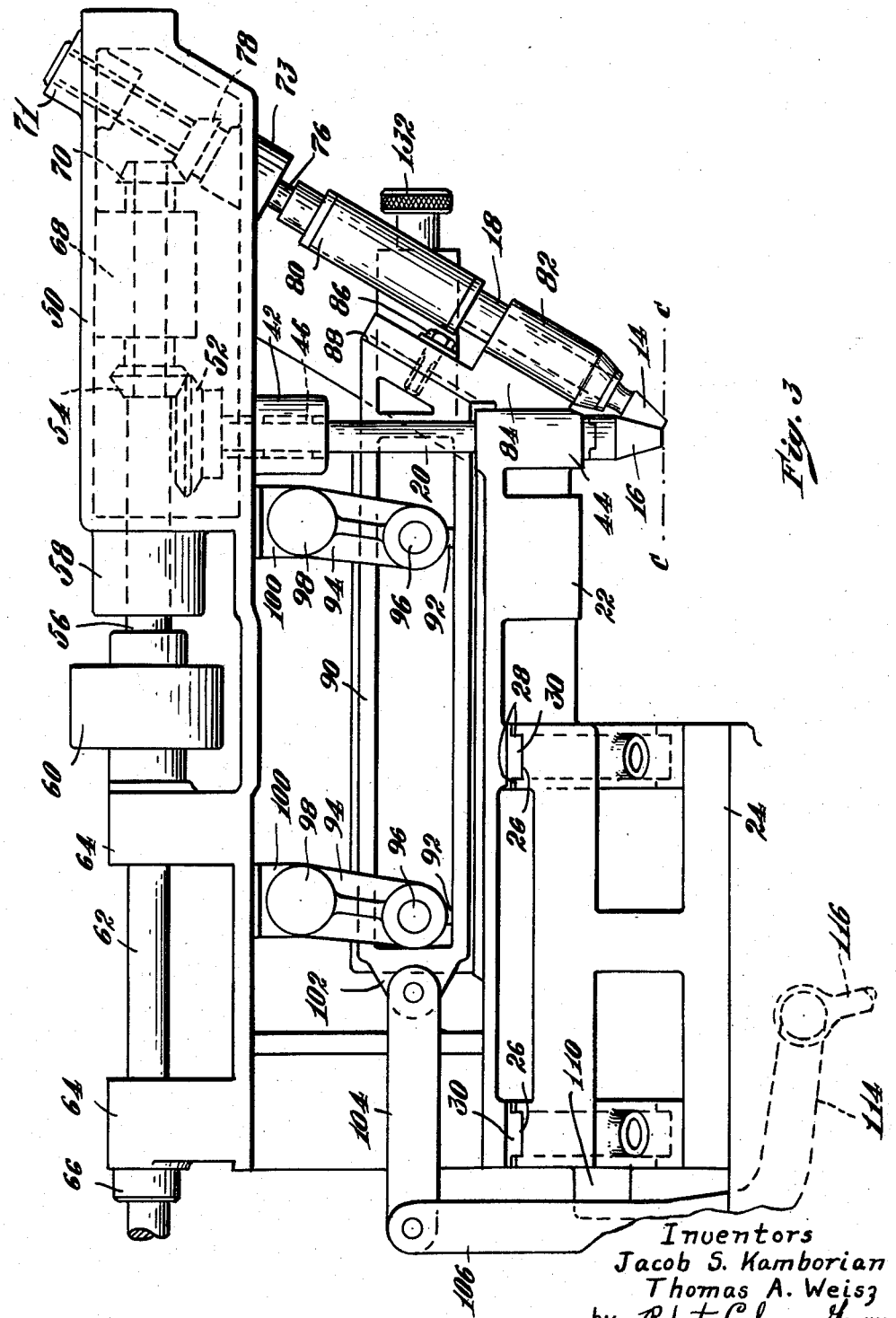

July 19, 1960
J. S. KAMBORIAN ET AL
2,945,247
LASTING MACHINE
Filed Aug. 18, 1955
5 Sheets-Sheet 3
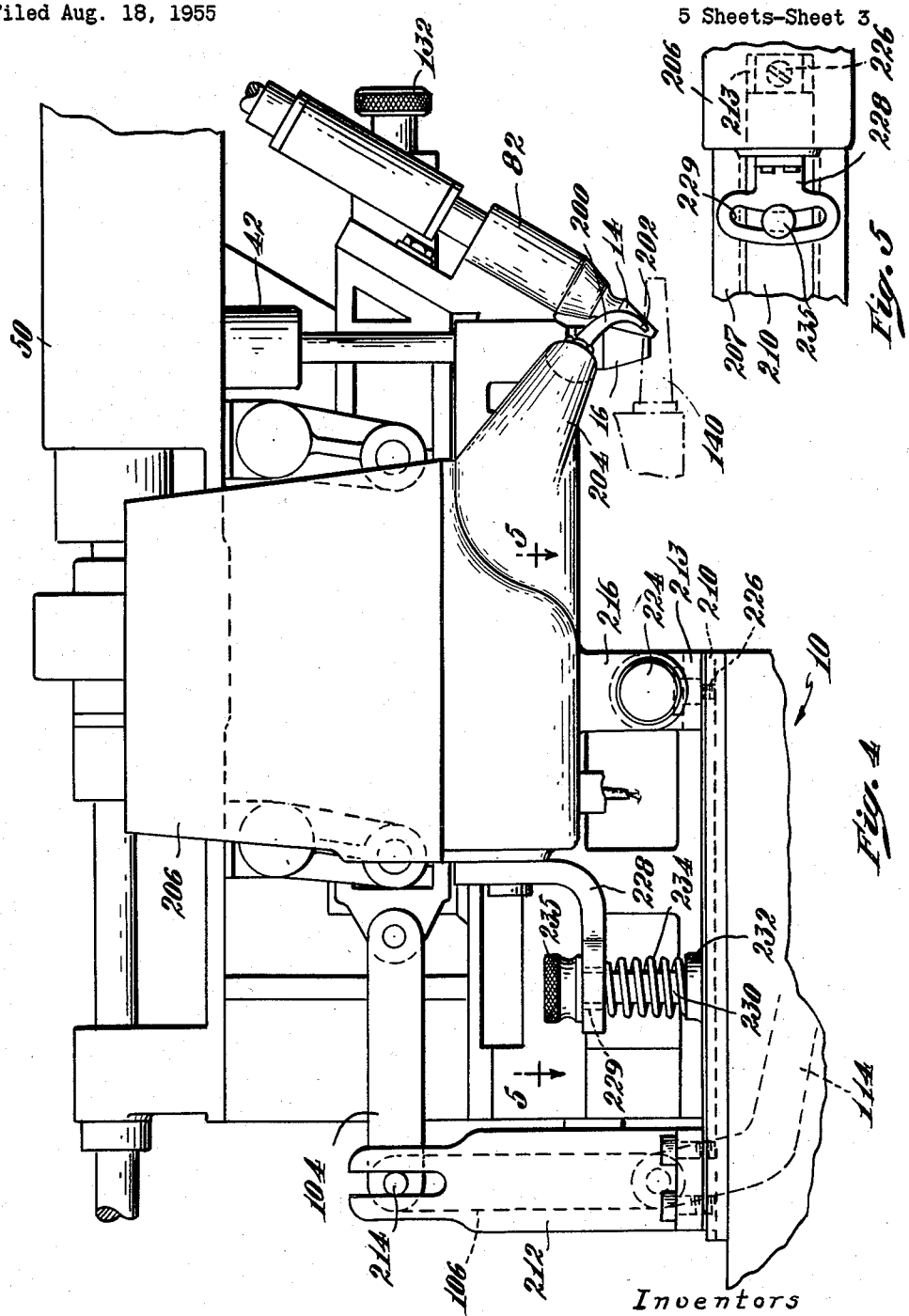
Inventors
Jacob S. Kamborian
Thomas A Weisz
by Roberts Cushman & Grown
attys

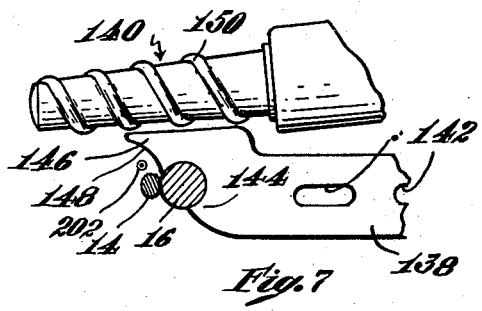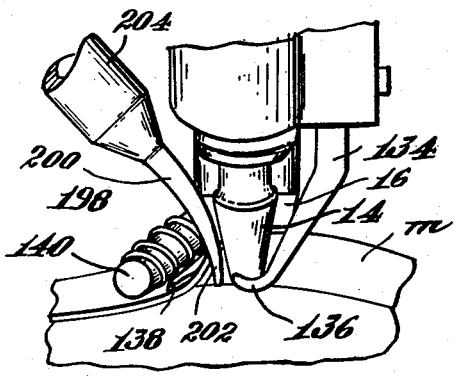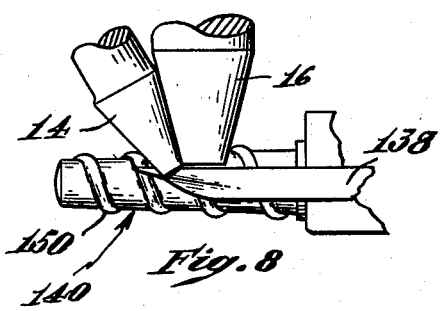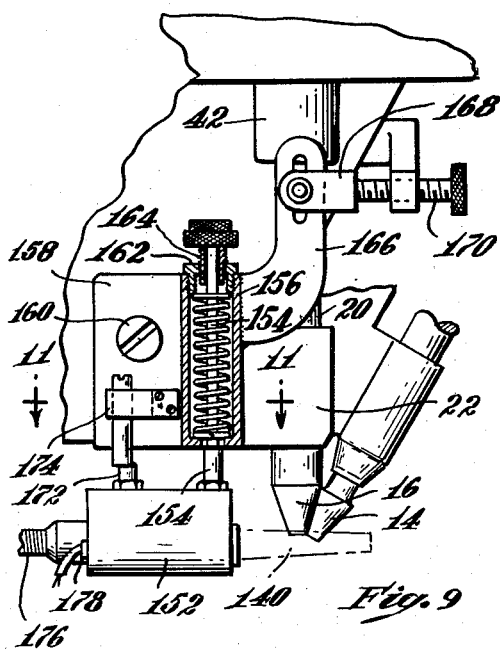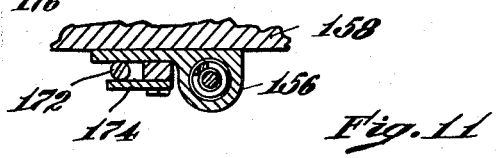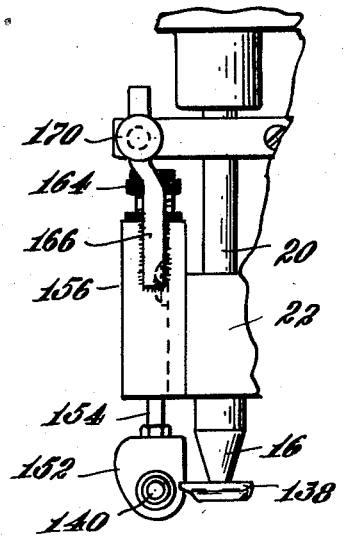

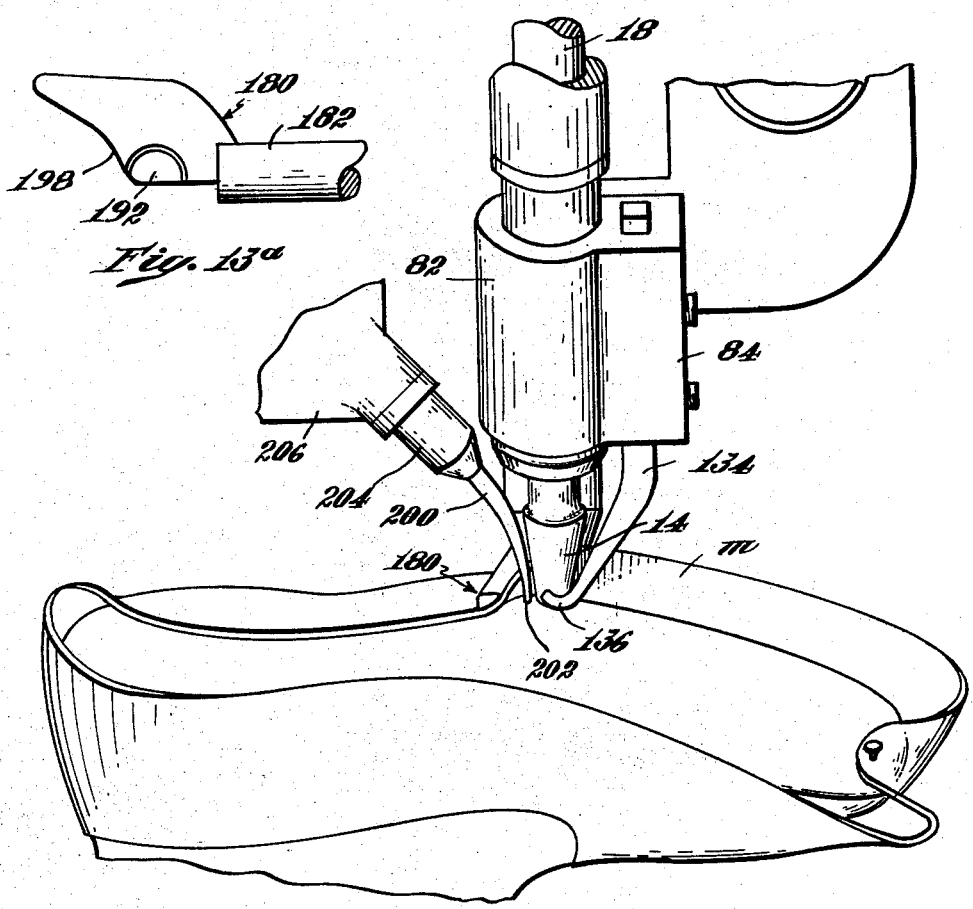

United States Patent Office 2,945,247
Patented July 19, 1960

2,945,247

LASTING MACHINE

Jacob S. Kamborian, West Newton, and Thomas A. Weisz, Plymouth, Mass., assignors, by mesne assignments, to said Jacob S. Kamborian Filed Aug. 18, 1955, Ser. No. 529,247

14 Claims. (Cl. 12—8.3)

This invention relates to lasting machines of the kind shown in Patent No. 2,873,461, issued February 17, 1959, in the name of Jacob S. Kamborian, in which a pair of oppositely turning rolls grip the lasting margin and continuously and substantially uninterruptedly apply both feeding and drafting stress thereto.

It is to be understood, however, that as hereinafter described the machine is equally useful in stretching a flexible covering over a core or other rigid form for making panels and similar articles.

The principal objects of this invention are to provide an organization of lasting instrumentalities including gripping and feeding rolls, wiper means and attaching means which will not only effect accurate conformity of the upper to the last but will also provide improved wiping and attaching operations. As herein illustrated, the machine has a pair of continuously rotating, oppositely turning tapering rolls for gripping the lasting margin, stressing it heightwise and feeding it linearly, so as to stress successive small areas of the lasting margin and then release them to the wiping and attaching instrumentalities. In accordance with the invention there are tapering feed rolls mounted for rotation in opposite directions on downwardly converging shafts journaled in a head frame, with their upper ends drivably connected to a constantly rotating drive shaft lying in the plane of the converging shafts. One of the shafts is supported by fixed bearings on the frame and the other by fixed and movable bearings, so that the other shaft can be moved relative to the fixed shaft to permit separating the rolls without interfering with the continuous rotation of the rolls.

The wiping means is preferably a rotary element arranged close to the rolls in a movable bearing and is adjustable angularly about axes parallel and at right angles to the plane containing the axes of the rolls and in elevation. There is means operably associated with the bearing for effecting adjustment of the wiper without interrupting the progress of the lasting operation.

Optionally, a fixed wiper may be employed, as contrasted to a rotary or reciprocating wiper, which is movable downwardly about a horizontal axis perpendicular to the direction of feed. The fixed wiper has an upper position limited by contact with the lower end of one of the feed rolls.

The attaching means is in the form of a nozzle to which adhesive is supplied from a reservoir and the reservoir and nozzle are mounted to move as a unit with the roll which has contact with the inner side of the lasting margin, relative to the roll which has contact with the outer side of the lasting margin to and from the latter roll. Additionally, the reservoir is movably mounted to afford adjustment of the nozzle angularly in vertical and horizontal planes.

The invention will now be described in greater detail with reference to the accompanying drawings wherein:

Fig. 3 is a side elevation of the head of the machine showing the lasting rolls, the wiper and fastening means being omitted;

Fig. 4 is a side elevation of the machine showing the lasting rolls, an applicator nozzle and an adhesive pot for supplying adhesive to the nozzle;

Fig. 5 is a fragmentary plan view taken on the line 5—5 of Fig. 4, showing the support for the rear end of the adhesive pot;

Fig. 6 is a fragmentary front view of the feed rolls showing a rotary wiper, a cement nozzle and a hold-down;

Fig. 7 is a horizontal view in a plane just above the rotary wiper showing the feed rolls in right section and the fixed wiper;

Fig. 8 is a fragmentary side elevation of the feed rolls as seen from the right side of Fig. 6;

Fig. 9 is a fragmentary side elevation of the left side of the machine showing the adjustment for the rotary wiper;

Fig. 10 is a front view of Fig. 9 with the inner roll omitted;

Fig. 11 is a horizontal section taken on the line 11—11 of Fig. 9;

Fig. 12 is a left-hand side elevation of the machine equipped with a pivoted wiper in place of a rotary wiper;

Fig. 13 is a right-hand side elevation of the machine with the pivoted wiper;

Fig. 13a is a plan view of the pivoted wiper;

Fig. 14 is a front view of the machine with the pivoted wiper, showing the position of the shoe with respect to the lasting instrumentalities;

Fig. 15 is a fragmentary front view of the machine with staple lasting means; and Fig. 16 is a corresponding view with tack lasting means.

Figure 1:
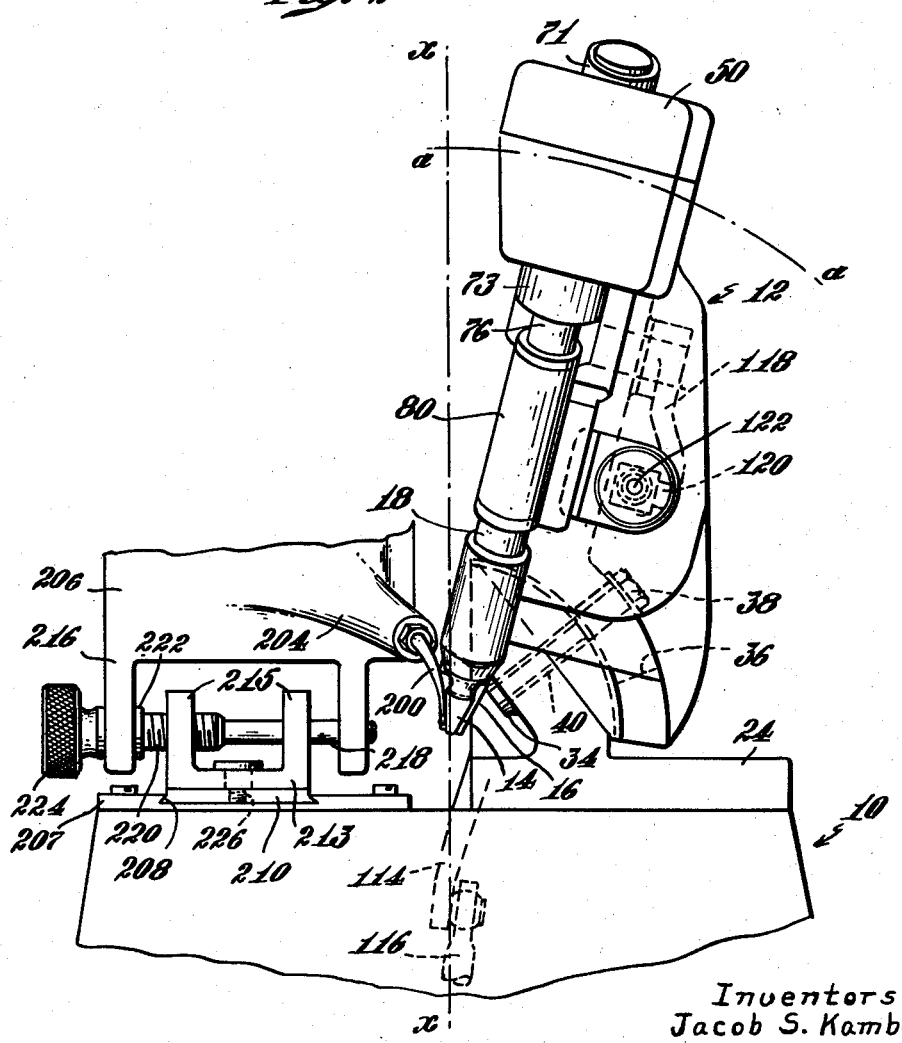
Fig. 1 is a front elevation of the head of the machine showing the lasting rolls and a fragmentary portion of the adhesive reservoir, the wiper and fastening means being omitted.

Referring to Figs. 1 and 4, the machine has a hollow base 10 standing upright from the floor, on which is mounted a head 12 which carries a pair of rolls 14 and 16 which are rotated in opposite directions, as will appear hereinafter, for applying feeding and updrafting stresses to the lasting margin of a shoe presented thereto. The rolls have downwardly tapering, conical surfaces and are mounted on shafts 18 and 20 (Fig. 3), the axes of which converge and lie in a common plane substantially at right angles to the direction of feed. The axis 20 of the roll 16 lies in a vertical plane parallel to the direction of movement of the shoe while the axis 18 of the roll 14 slopes transversely of the bottom of the shoe, downwardly toward the outer side thereof and toward the axis of the roll 16. The relative positions of the axes of the rolls are fixed but may be bodily tilted in an arc a—a (Fig. 1) which lies in the aforesaid vertical plane with reference to a perpendicular to the base represented by the line x—x, as will appear hereinafter, through approximately 15° from the vertical, about a center which coincides substantially with the intersection of the axes of the rolls. The cone of the roll 14 is slenderer than that of the roll 16 and they have contact along a line which slopes downwardly, transversely of the shoe bottom toward its outer edge. Preferably the surfaces of both rolls 14 and 16 are roughened and may optionally have ribbing or grooves of appropriate design to assist in gripping and applying both feeding and drafting stresses to the lasting margin.

The principal drafting forces are attained by the angular relation of the rolls with respect to each other, which is in the order of 18°, although the angle may vary from 10° to 25°. At a greater angle than 25° the forward inclination of the shaft 18 interferes with the operator's visibility and constitutes an obstruction to bringing the shoes easily into place. In the preferred practice for cement lasting, the rolls are maintained in a substantially vertical position; however if an unusually strong pull is required for exceedingly stiff upper material the rolls may be bodily tilted at an angle inclined to the direction of feeding. Also where attaching elements such as staples or tacks are employed which have to be driven substantially perpendicular to the bottom, the head must be inclined to leave room for the staple driving or tack driving means to operate.

To effect the angular adjustment of the feed rolls to increase the drafting stress applied to the lasting margin or for use with staple mechanism, the head 12 has a part 22 (Fig. 3) which is supported for tilting on a fixed part 24, the latter being bolted to the top of the pedestal 10. As illustrated in Fig. 3, the fixed part 24 has spaced arcuate bearing surfaces 26—26, each of which is provided with spaced flanges 28—28, and the part 22 has on it correspondingly spaced bearing tracks 30—30 slidably engaged with the bearing surfaces 26—26 between the flanges 28—28. The centers of the radii of curvature of the bearings 26—26 lie on a horizontal line in the plane of the axes and passes through the lower end of the roll 16, as shown by the dot and dash line C (Fig. 3), so that angular adjustment of the part 22 to change the inclination of the feed rolls takes place about the line C as a center. A hole 34 is drilled in the part 24 through each of the bearing surfaces 26, along a line with coincides with the radius of curvature of the bearings and the lower end is threaded at 40. The part 22 has in its bearing track slots 36—36. Bolts 38—38 are placed through the slots 36—36 into the holes 34—34 and screwed into the lower threaded ends thereof, thereby providing adjustable means for the part 22 with reference to the part 24 at any given desired angular position.

The shaft 20 for the roll 16 (Fig. 3) is supported in spaced bearings 42 and 44 carried by the part 22, which are provided with suitable bearing sleeves 46. The upper end of the shaft 20 extends into a hollow gear housing 50 of which the bearing 42 is an integral part and which is cast integral with the part 22, and has fast to its upper end a miter gear 52. The gear 52 meshes with a miter gear 54 fast to a horizontally arranged drive shaft 56 journaled in the housing. The shaft 56 extends rearwardly from the housing 50 through a bearing 58 and is connected by a coupling 60 to a horizontal shaft 62 in axial alignment therewith, journaled in upwardly projecting spaced bearings 64—64 formed integral with the part 22. The rear end of the shaft 62 extends through the rear one of the bearings 64 and has fastened thereto a collar 66, which in cooperation with the coupling 60 prevents axial movement of the shaft 62. Rotation of the shaft 62 may be effected in any conventional manner, either by way of a direct drive from an electric motor or indirectly by gears or belting to an electric motor located below the shaft on the top of the pedestal or within it at the base of the machine.

The shaft 56 extends forwardly from the gear 54 through a bearing 68 fastened to the inside of the housing 50 and has fastened to it a second miter gear 70. Forwardly of the miter gear 70 the housing has upper and lower spaced bearings 71 and 73 in which is journaled an inclined shaft 76, the axis of which coincides with the axis of the shaft 18, on which is mounted the roll 14. The shaft 76 has splined to it a miter gear 78 which meshes with the gear 70 and is connected to the shaft 18 by a coupling element 80.

As heretofore pointed out the rolls have different tapers and hence if rotated at the same speed would have different surface speeds at their common place of contact with the lasting margin. Thus when the upper includes a lining the different speeds would displace the lining relative to the outer material causing wrinkles. Moreover even when no lining was used there would be a tendency to stretch the margin and hence to produce wrinkles. Accordingly, the surfaces of the rolls must have rolling contact, hence the shafts are rotated at angular speeds which are inversely proportional to the radii of any two tangentially related right sections of the rolls. As thus rotated all the points on the perimeter of any right section of one roll are traveling at the same linear speed as all the points on the right section of the other roll with which it is tangent. From right section to right section axially, successive pairs of points have a greater linear speed in the direction of the larger ends of the rolls and a lesser linear speed in the direction of the smaller ends of the rolls. Rotation of the rolls as required may be effected by using suitable gearing ratios for the gears 52, 54, 70 and 78.

It is desirable to provide for yield between the rolls 14 and 16 during movement of the work therebetween and also to positively separate the feed rolls if the occasion requires it. Accordingly the shaft 18 is provided with a movable bearing 82 near its lower end which is movable to permit limited separation of the rolls. The bearing 82 has a supporting bracket arm 84 which extends upwardly and laterally therefrom. The bracket arm 84 is fastened by a bolt 86 to the forwardly and downwardly inclined face 88 of a slide member 90. The face 88 may be grooved to receive a tongue on the bracket arm 84 so that no skew movement can take place between the two. The slide member 90 is of hollow rectangular construction and has spaced webs 92—92 to which the lower ends of a pair of spaced arms 94—94 are connected by pins 96—96. The upper ends of these arms 94—94 are in turn pivotally connected by pins 98—98 to depending bosses 100—100 integral with the part 22. As thus constructed the slide 90 suspended by the arms 94—94 is movable substantially horizontally. The slide 90 has at its rear end a boss 102 to which is pivotally connected a link 104. The opposite end of the link 104 is pivotally connected to a bell-shaped lever having an upright arm 106 and is pivoted at its elbow on a boss 110 extending rearwardly from the part 22 for tilting movement about a horizontal axis. A downwardly and forwardly inclined arm 114 connects the lever to the upper end of a treadle rod 116. By pulling down on the treadle rod 116 the bell crank lever may be rotated or tilted in a clockwise direction so as to impart a forward thrust to the link 104 and hence to the slide 90 and thus to separate the roll 14 from the roll 16. While the movement of the slide 90 is not strictly linear the arms 94—94 are comparatively long with respect to the actual linear movement required to separate the rolls the desired amount. Hence very little vertical displacement of the bearings takes place and such as there is, is taken up by play in the parts. To permit separation of the roll 14 from the roll 16 the shaft 76 is made slidable in its bearing and the gear 78 is connected thereto by a spline so that as the slide 90 is moved outwardly the shaft 76 moves outwardly and upwardly.

Figure 2:
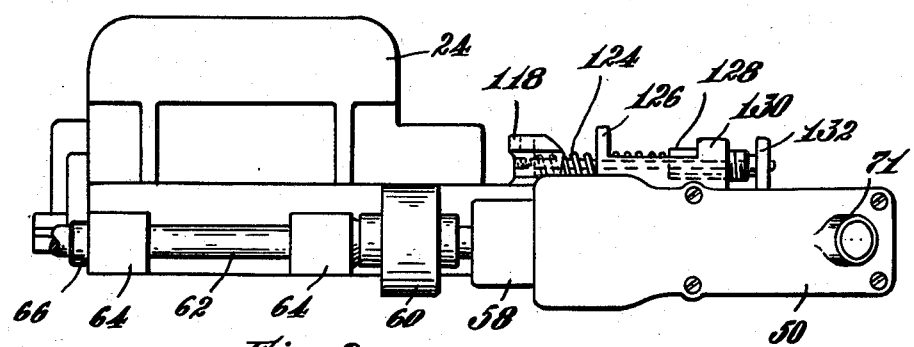
Fig. 2 is a top view of the head.

Under operating conditions the roll 14 is yieldably urged toward the roll 16 and it is desirable to provide for varying the pressure between the rolls. Accordingly the upper pivot 98 (Figs. 1 and 3) at the forward end of the slide 90 is provided with an axial extension protruding from one side and has fastened to it an arm 118, the lower end of which carries a pivoted block 120. A rod 122 is threaded at one end to the block 120 and has mounted thereon a strong coiled spring 124 (Fig. 2), one end of which bears against the block. The rod and spring extend forwardly through an aperture in a flange 126 integral with the part 22, large enough to provide a guiding bearing without binding into a hollow sleeve 128 so that the opposite end of the spring bears against the inner end of the sleeve. A hole in the end of the sleeve permits the end of the rod to extend therethrough. The sleeve is externally threaded and mounted in a correspondingly threaded boss 130 so that by rotation it may be moved axially. A hand wheel 132 is fast to the forward end of the threaded sleeve to assist rotation thereof, and by rotation the spring may be compressed or relaxed, thereby to increase or decrease the pressure exerted by it on the arm 118. Thus the slide 90 through the arm 118 and its pin 98 is urged rearwardly so as to yieldably hold the roll 14 in gripping relation to the roll 16.

A hold-down 134 (Figs. 6 and 14) may optionally be fastened to the mounting bracket 84 of the inner roll 14, and has a lower arcuate portion 136 lying substantially parallel to the direction of feed, which projects axially beyond the tip of the roll 14. As thus constructed the hold-down bears against the margin of the sole close to its edge so as to hold it down in opposition to the lasting stresses and simultaneously keeps the lower end of the inner roll 14 out of contact with the sole, thereby eliminating any danger of crushing or otherwise damaging the edge and preventing the rolls from taking too big a bite on the lasting margin regardless of the intensity of the stress applied thereto. If desired the hold-down 134 may be omitted and the lower end of the inner roll 14 rounded off so as to provide a smooth knob for contact with the shoe bottom.

Wiping means of suitable kind is mounted adjacent the rolls at the side from which the lasting margin emerges for folding the lasting margin inwardly over the bottom and holding it stressed against the bottom for attachment thereto.

Preferably the wiping means as shown in Figs. 6, 7 and 8 is constituted by a fixed pressure wiper blade 138 and a lasting-in wiper 140. As shown in Fig. 7 the pressure wiper blade 138 has a pair of slots 142 for receiving bolts by means of which the blade it attached to the frame with its operating end 144 adjacent the feed rolls. The top of the blade lies directly under the lower end of the roll 16 (Fig. 8) and has a forwardly and laterally projecting tip 146, the forward edge 148 of which skirts the feed roll 14 closely so as to control the lasting margin. The lasting-in wiper 140 is a tapered conical roll having a helical rib 150 on its surface and is mounted, as will appear hereinafter, so that it lies close to the discharge side of the feed rolls and the outer edge of the fixed blade 138 in a substantially horizontal position extending substantially transversely with respect to the shoe bottom. The roll is rotated in a clockwise direction as seen in Fig. 6, so as to assist in movement of the shoe. The exact position of the wiper roll may be adjusted by small amounts with reference to the feed rolls to facilitate operating on shoes of different kinds and to provide close control of the lasting margin so that it may be wiped down into contact with the shoe bottom at all points. To this end the wiper 140 is rotatably mounted in a bearing 152 (Figs. 9 and 10), which is connected to the lower end of a pivoting spindle 154. The spindle 154 extends upwardly through a sleeve 156 carried by a bracket plate 158 which is pivotally supported on the frame 22 for rocking on a pin 160, the axis of which is perpendicular to the plane of the axes of the feed rolls. A spring within the sleeve 156 is held under compression therein by a hollow screw 162 threaded into the top or upper end of the sleeve and operates yieldably to hold the spindle 154 and hence the wiper at a predetermined depressed position. A nut 164 threaded into the hollow screw 162, having engagement with the underside of a head at the upper end of the spindle, provides for raising or lowering the spindle 154 so as to adjust the wiper heightwise with respect to the shoe bottom. An arm 166 is fastened to the bracket and has pivotally connected to its upper end a socket 168, to which is connected one end of a screw 170, a portion of which is threaded through a fixed abutment on the frame of the machine. Accordingly by rotating the screw 170 the bracket plate 158 may be rocked about the pivot pin 160 so as to change the angular position of the wiper in a plane parallel to the plane of the axes of the feed rolls. An eccentric pin 172 is fastened to the bearing 152, rearwardly of the spindle 154, so as to be free to rotate and has a portion extending upwardly therefrom through a fixed boss 174 on the bracket 158. Rotation of the pin 172 will therefore swing the bearing 152 angularly in a plane perpendicular to the axis of the spindle thus to change the angular position of the wiper in a plane perpendicular to the axis of the roll 16.

From the foregoing it is apparent that the rotary wiper has three independent adjustments, namely vertical adjustment with respect to the shoe bottom, angular adjustment in the plane perpendicular to the axis of the feed roll 16, and angular adjustment in a plane parallel to the plane containing the axes of the feed rolls 14 and 16, and that additionally the wiper is yieldable in all positions of adjustment. Thus a very close control of the wiping action may be attained regardless of the kind of shoe and the kind of upper material, thereby making it possible to insure proper wiping of the most stubborn upper leathers even where there are sharp changes in bottom contour and of very light upper leathers without damage thereto. These adjustments may be made during the course of a lasting operation and if desired, quick-acting screws with wheels or levers may be employed to facilitate the adjustment without interrupting the progress of the lasting operation.

To permit the multiple adjustments of the rotary wiper 140 the rear end of the wiper roll is driven by a flexible cable 176 (Fig. 9) which extends rearwardly therefrom to a suitable driving element. Furthermore in order that the wiper may be heated the bearing 152 is provided with a bore substantially parallel to the axis of the wiper in which there is inserted a heating cartridge 178 which consists of a resistance element enclosed within suitable electrical insulation provided with leads by which it may be connected to a source of current.

Alternatively a nonrotating but tiltable wiper blade 180 may be used, as shown in Figs. 12 to 14 inclusive. This blade is mounted on the frame on a horizontal spindle 182, substantially perpendicular to the direction of feed. The spindle 182 is rotatable in a bearing bracket 184 bolted to the underside of the part 22 and has at its rear end a squared portion on which is mounted a lever 186, which has at one end a square hole adapted to fit over the squared end of the spindle and at its opposite end an aperture. An anchoring bolt 188 is supported in said aperture on the lever 186 and has attached to it a spring 190 which urges the lever and hence the spindle to turn in a counterclockwise direction as seen in Fig. 14. The spindle is bored axially and a heating element, not shown, but similar to that described in Fig. 9 is mounted therein, which is supplied with current from a suitable source by conductors. The spring 190 urges the outer side of the blade downwardly so that it will faithfully follow the contour of the bottom during manipulation of the shoe. The upper surface of the blade is flat (Fig. 13a) and has a depression or recess 192 in it to receive the lower end of the outer feed roll 16, the latter serving as an upper limit for limiting the blade to an upper horizontal position. The underside of the blade has behind the outer roll an upwardly inclined shoulder 194 against which the shoulder of the last may be placed to help position the shoe with respect to the rolls and a forwardly and upwardly inclined surface 196 which gathers the lasting margin as it enters the roll and assists in bending it over the shoulder, guiding it upwardly so that it issues from the delivery side of the feed rolls without wrinkling. The edge 198 (Fig. 13a) of the blade closely skirts the surface of the inner roll 14 thus operating on the margin very close to its delivery from the rolls with the result that close control can be maintained and hence wiping can be attained with very little loss of stress. In the preferred vertical position of the feed rolls the proximity of the rolls and wiper creates a pinching action on the upper as it is released by the rolls which holds the margin until it is transferred into contact with the bottom with the least possible loss of stress and the maximum smoothness.

A reciprocating wiper such as shown in U.S. Patent No. 2,251,285 may also be used.

Various kinds of attaching means may be employed, for example a nozzle for applying liquid adhesive, staple mechanism or tack driving mechanism. Preferably, as shown in Figs. 1, 4, 5, 6 and 7, a nozzle 200 having a bent end 202 (see also Figs. 12 and 14) is arranged to project downwardly between the wiper and feed rolls beneath the lasting margin $m$, close to the place that it issues from the rolls. The nozzle has a heated jacket 204 extending along it to keep the adhesive liquid all the way from a cement pot 206 to which it is connected. The cement pot 206 is of the kind illustrated in pending applications, Serial No. 473,169, filed December 6, 1954, now abandoned, and Serial No. 505,105, filed May 2, 1955, in the name of T. A. Weisz, and now Patent No. 2,809,772, granted Oct. 15, 1957, and preferably includes a pump, such as shown in the latter application.

Preferably a quick-acting thermoplastic adhesive is employed and delivered through the nozzle 200 close to the rolls at the inner side of the lasting margin just before it is turned down by the wiper. The adhesive should be maintained at a temperature close to its solidifying point so that it will set quickly and within the intervals while the margin is moving beneath and subjected to the wiping action of the wiper, and in sufficient quantity to provide an adequate bond.

To facilitate close control of the place at which the adhesive is applied which is necessary because the setting point of the adhesive is critical and the wiping must neither be too early or too late, the nozzle must be adjustable with respect to the shoe bottom, to the feed rolls and to the wiper. Since the nozzle 200 is fixed to the pot the latter is mounted for adjustment and by its adjustment affords adjustment for the nozzle. Referring to Figs. 1, 4 and 5, there is mounted on the top of the pedestal at the left side of the feed rolls a plate 207 having a dovetail way 208 in its upper surface which extends forwardly and rearwardly. A slide plate 210 having beveled edges is mounted to slide in the way and has at its rear end (Fig. 4) a fork 212 which embraces a pin 214 forming an extension of the pin connecting the link 104 to lever arm 106. Thus when the treadle rod 116 is depressed to separate the feed rolls the slide plate 210 will be moved forwardly with the roll 14 and this in turn will move the pot 206 carried by the slide plate and hence the nozzle 200 away from the margin of the shoe. On the slide plate 210 there is a yoke 213 having spaced parallel upright arms 215 through which are axially aligned holes. The cement pot 206 has at its bottom, near the front end, a pair of spaced parallel arms 216 which are more widely spaced than the arms 215 so that when the pot is lowered over the arms 215 the arms 216 overlap the outer sides of the arms 215. The arms 216 also have aligned holes and a spindle 218 is inserted through the holes in the arms 216 and 215 so that the pot is pivotally supported on the spindle for tilting about a horizontal axis. A part of the spindle 218 is threaded at 220 and this part is engaged with corresponding threads in the left-hand arm 215, through which it passes, so that by rotation of the spindle the lateral position of the pot may be shifted axially of the spindle about a pivot at the rear end of the pot which will be described hereinafter. To provide for turning the spindle and to prevent shifting of the spindle 218 in the arms 216 it has a flange 222 and a head 224 spaced to receive the arm 216 at that end of the spindle. The yoke 213 is fastened to the plate 210 by a vertical screw 226 (Fig. 1), having a boss where it passes through the yoke so that the latter is pivotal about the vertical axis of the screw. The rear end of the pot is supported by a right angle bracket 228 (Fig. 4) bolted to the rear wall of the pot with one of its arms in a substantially horizontal position. This horizontal arm has an aperture 229 (Fig. 5) to receive a screw bolt 230, the lower end of which is fixed in a boss 232 on the plate 210. A coiled spring 234 is mounted on the bolt between the arm and the boss yielding to support the arm. A knurled nut 235 is threaded on the upper end of the bolt and by rotation of the nut the pot may be tilted about the horizontal axis of the spindle 218. The aperture 229 in the horizontal arm of the bracket 228 is arcuate (Fig. 5) so that by loosening the nut the pot may be swung about the vertical axis of the screw 226. The bolt 230 also serves as a pivot for the rear end of the pot so that the pot may be swung about it as a center by rotation of the spindle 218 referred to above. Since the radius of swing of the pot about the bolt 230 is quite long the movement of the pot and hence of the nozzle by rotation of the spindle 218 is almost linear for the very short distance it travels. The radius of swing about the screw 226 is, however, much shorter so that movement of the nozzle about this axis is angular. Thus it is apparent that by adjustment of the pot the nozzle may be shifted substantially bodily, axially of the spindle 218 to move it toward and away from the bite of the feed rolls, that it may be tilted about the axis of the spindle 218, downwardly and upwardly with respect to the bottom of the shoe, and that it may be pivoted in a horizontal plane about the axis of the screw 226 for movement to and from the lasting margin. Additionally it may be moved forwardly away from the lasting margin when the inner roll 14 is separated from the outer roll by treadling the rod 116 which slides the plate 210 forwardly and rearwardly.

It is also contemplated that mechanical fastening means may be employed, for example staples, by means of the staple mechanism (Fig. 15), of the kind shown in U.S. Patent No. 2,424,240, which is designed for McKay shoes. For welt stapling the staple mechanism is mounted in a horizontal position as shown in U.S. Patent No. 2,424,239. For tack lasting (Fig. 16) driving means such as shown in U.S. Patent No. 2,251,284 may be used.

When a shoe mounted on a last together with the insole is presented to the aforesaid machine the lasting margin may be introduced between the rolls 14 and 16 by a skilled operator without treadling the machine so as to separate them. Separation of the rolls is useful, however, where for example the work becomes jammed or caught, so that it may be extricated with the least possible delay and to assist novices in acquiring skill in operation of the machine. When operating on the lasting margin the lasted shoe is presented by first tilting the shoe at a sharp angle to facilitate engaging the lasting margin with the feed rolls and then swinging the shoe to a substantially horizontal position so that its bottom lies in a substantially horizontal plane with the hold-down 136 or the lower end of the inner roll, as the case may be, engaged with the bottom of the shoe. The feed rolls advance the shoe without assistance of the operator, applying an updrafting stress to the lasting margin which is opposed by the hold-down, so that a strong pull is exerted perpendicular to the shoe bottom. With heavy stiff upper material the lasting stress may be increased by swinging the feed rolls in a clockwise direction so that the greater component of force applied to the lasting margin is directed upwardly. Where very light elastic upper material is used only a small lasting stress is desired, hence the rolls are swung counterclockwise so as to be perpendicular to the bottom of the shoe.

By reason of the multiple adjustment available both for the nozzle and the rotary wiper it is possible to apply the adhesive in just the right position so that the margin will not be laid down too early with respect to the setting of the adhesive which would result in failure of the bond and in the margin pulling away after it passed beyond the wiping roll or too late so that the adhesive sets before the margin is laid down and hence will not be in a condition to bond the margin when it is laid down.

The adjustment of the rotary wiper and also of the pivoted wiper additionally affords an opportunity to control the wiping action more closely along depressions and high spots in the bottom and to adjust the pressure and wiping action for upper material of different qualities of leather.

It should be understood that the present disclosure is for the purpose of illustration only and that this invention includes all modifications and equivalents which fall within the scope of the appended claims.

We claim:

1. In a lasting machine a pair of oppositely turning tapering rolls for applying uninterrupted progressive lasting stresses to the lasting margin of a shoe, a rotary wiper adjacent the discharge side of the rolls and means for effecting angular adjustment of the wiper in a plane parallel to the plane containing the axes of the rolls.

2. In a lasting machine a pair of oppositely turning, outer and inner tapering rolls for applying uninterrupted progressive lasting stresses to the lasting margin of a shoe, a rotary wiper adjacent the discharge side of the rolls, and means adjustably supporting the wiper for movement parallel to the axis of the outer roll in a plane parallel to the plane containing the axes of the rolls.

3. In a lasting machine a pair of oppositely turning tapering rolls for applying uninterruped progressive lasting stresses to the lasting margin of a shoe, a rotary wiper adjacent the discharge side of the rolls, a bearing rotatably supporting the wiper, said bearing being vertically adjustable relative to the bottom of a shoe presented to the rolls, angularly adjustable about an axis substantially perpendicular to the bottom of the shoe, and angularly adjustable about an axis substantially parallel to the bottom of the shoe.

4. In a lasting machine a pair of oppositely turning, downwardly tapering rolls for gripping the lasting margin of a shoe and applying lasting stresses thereto in a continuous and progressive manner, a wiper, means supporting the wiper for movement relative to the rolls and means operable during the uninterrupted progress of the lasting operation to change the position of the wiper with respect to the rolls.

5. In a lasting machine a pair of oppositely turning, downwardly tapering rolls for gripping the lasting margin of a shoe and applying lasting stresses thereto in a continuous progressive manner, a rotary wiper, means supporting the wiper for movement relative to the rolls and means operable during the uninterrupted progress of lasting the margin to change the level of the wiper and its angularity with reference to the rolls.

6. In a lasting machine of the kind in which a pair of oppositely turning rolls apply a progressive and continuous lasting stress to the lasting margin of a shoe, a rotary wiper, a flexible shaft for effecting rotation thereof, a screw for adjusting the wiper substantially perpendicular to the shoe bottom, a second screw for adjusting the wiper about a substantially horizontal axis parallel to the bottom of the shoe, and a cam for adjusting the wiper about an axis substantially perpendicular to the shoe bottom.

7. In a lasting machine of the kind in which a pair of oppositely turning, outer and inner rolls apply a lasting stress progressively and continuously, a rotary wiper, a flexible shaft connected to the rear end of the wiper for effecting rotation thereof, a bearing supporting the wiper for rotation, a bracket pivotally mounted on the frame for movement about an axis perpendicular to the plane containing the axes of the rolls, a hollow screw mounted on the bracket, a spindle mounted in the screw, said spindle having a head at one end engaged with an end of the screw, and means at the other end of the spindle connecting it to the bearing, said screw being adjustable on the bracket to effect movement of the wiper heightwise and a cam on the bracket spaced from the screw operable by contact with the bracket and bearing to turn the bearing about the axis of the screw.

8. In a lasting machine of the kind having oppositely rotating feed rolls for stressing the lasting margin of a shoe in a progressive and continuous manner, an applicator nozzle and means supporting the nozzle on the frame for angularly adjusting its delivery end about a horizontal axis toward and away from the bottom of the shoe, for adjusting its delivery end substantially linearly, parallel to the bottom of the shoe toward and away from the bite of the feed rolls at the outgoing side thereof, and for angularly adjusting its delivery end about an axis substantially perpendicular to the bottom of the shoe.

9. In a lasting machine of the kind in which a pair of oppositely turning feed rolls apply a lasting stress to the lasting margin of a shoe in a progressive and continuous manner, and a wiper is located at the discharge side of the rolls for wiping the stressed lasting margin inwardly over the bottom as it is released by the feed rolls, a bracket, a nozzle mounted on the bracket with an end of it located between the feed rolls and wiper, means supporting the bracket at spaced points for angular movement about vertical axes, one of which is nearer the nozzle than the other, whereby movement about the more remote of the axes is substantially linear for the small travel of the nozzle between the feed rolls and the wiper, and movement about the other is predominantly angular, means at the nearer axis supporting the bracket for angular movement about a horizontal axis, and for effecting linear movement, and means at the more remote axis for effecting both angular adjustments.

10. In a lasting machine a pair of oppositely turning, downwardly tapering rolls for gripping the lasting margin of a shoe and applying lasting stresses thereto in a constantly progressive manner, a wiper for laying the stressed margin against the bottom of the shoe as it is released from the rolls, a frame yieldably supporting one of the rolls for movement away from the other to permit introduction of the work therebetween, a reservoir mounted on the frame, a nozzle connected to the reservoir and in communication therewith, said nozzle having an end of it arranged between the rolls and the wiper, and means for adjusting the reservoir on the frame and hence the end of the nozzle with reference to the rolls, said means affording lateral movement of the nozzle between the wiper and rolls and angular rocking movement of its axis about a horizontal axis substantially parallel to the shoe bottom.

11. In a lasting machine a pair of oppositely turning, downwardly tapering rolls for gripping the lasting margin of an upper and applying lasting stresses thereto, said rolls having rolling contact, a fixed wiper blade subjacent the outer roll having a forwardly projecting, crescent-shaped edge skirting the peripheral surface of the inner roll, a rotary wiper mounted at the outgoing side of the rolls and the fixed wiper, said wiper being supported for multiple adjustment with reference to the shoe bottom, and a nozzle having a hooked end arranged between the rolls and the rotating wiper for multiple adjustment between the rolls and the rotating wiper laterally from side to side and angularly about a horizontal axis.

12. In a lasting machine a pair of oppositely turning, frusto-conical rolls for gripping the lasting margin of an upper and applying both feeding and drafting stresses thereto, means yieldably supporting the rolls with their operating surfaces in contact which permits relative movement of the rolls when the lasting margin is introduced therebetween, a wiper pivoted on an axis fixed horizontally perpendicular to the direction of feed, and a hold-down and cement nozzle mounted for yielding movement with the inner roll relative to the outer roll, said hold-down having a portion projecting beyond the lower extremity of the inner roll for contact with the bottom of the shoe close to the edge of the sole, and said nozzle having an extremity located within the angle between the bottom and the inner surface of the lasting margin at the delivery side of the rolls for delivering liquid adhesive to the surfaces to be united.

13. In a lasting machine of the continuous type, lasting instrumentalities which grip the lasting margin between them and apply both updrafting and feeding forces to the margin, and a wiper next to the lasting instrumentalities having a turning surface adapted to fold the stressed margin as it leaves the lasting instrumentalities against the bottom of the shoe, and means supporting the wiper so that it may tilt from a horizontally limited upper position downwardly about a horizontal axis perpendicular to the direction of feed.

14. In a lasting machine of the continuous type, lasting instrumentalities which grip the lasting margin between them and apply both updrafting and feeding forces thereto, a wiper next to the lasting instrumentalities having a turning surface adapted to fold the stressed margin as it leaves the lasting instrumentalities against the bottom of the shoe, means supporting the wiper for tilting movement about an axis perpendicular to the direction of feed, means yieldably operating on the wiper to displace it downwardly about said axis and means limiting upward displacement of the wiper to a substantially horizontal position.

References Cited in the file of this patent

UNITED STATES PATENTS

| | | |
|---|---|---|
| 2,140,532 | Lawson | Dec. 20, 1938 |
| 2,251,284 | Kambarian | Aug. 5, 1941 |
| 2,326,193 | Baker | Aug. 10, 1943 |
| 2,447,062 | Fredericksen | Aug. 17, 1948 |
| 2,463,017 | Brostrom | Mar. 1, 1949 |
| 2,571,140 | Kambarian | Oct. 16, 1951 |
| 2,655,671 | Fossa | Oct. 20, 1953 |
| 2,667,908 | Kambarian | Feb. 2, 1954 |
| 2,701,003 | Kambarian | Feb. 1, 1955 |
| 2,712,659 | Paulsen | July 12, 1955 |